US012789115B2

(12) United States Patent
Puwakkatiya Kankanam et al.

(10) Patent No.: US 12,789,115 B2
(45) Date of Patent: Nov. 10, 2026

(54) CHROMATOGRAPHY SYSTEM

(71) Applicant: Sanofi, Paris (FR)

(72) Inventors: Eranda Puwakkatiya Kankanam, Lexington, MA (US); George Weeden, Jr., Grafton, MA (US)

(73) Assignee: Sanofi, Paris (FR)

(*) Notice: Subject to any disclaimer, the term of this patent is extended or adjusted under 35 U.S.C. 154(b) by 1019 days.

(21) Appl. No.: 17/943,514

(22) Filed: Sep. 13, 2022

(65) Prior Publication Data

US 2023/0083539 A1 Mar. 16, 2023

Related U.S. Application Data

(60) Provisional application No. 63/243,836, filed on Sep. 14, 2021.

(30) Foreign Application Priority Data

Nov. 3, 2021 (EP) .................................... 21315233

(51) Int. Cl.

*B01D 15/18* (2006.01)
*B01D 15/16* (2006.01)
*B01D 15/42* (2006.01)

(52) U.S. Cl.

CPC ....... *B01D 15/1871* (2013.01); *B01D 15/166* (2013.01); *B01D 15/424* (2013.01)

(58) Field of Classification Search

CPC .............. B01D 15/1871; B01D 15/166; B01D 15/424; B01D 15/10; C12M 47/12; G01N 2030/8831; G01N 30/461; G01N 30/8631

See application file for complete search history.

(56) References Cited

U.S. PATENT DOCUMENTS

| | | | | |
|---|---|---|---|---|
| 2003/0165941 | A1 | 9/2003 | Gjerde et al. | |
| 2018/0339244 | A1 | 11/2018 | Hubbuch et al. | |
| 2019/0336886 | A1* | 11/2019 | Hyckenberg | G01N 30/8686 |
| 2020/0378934 | A1* | 12/2020 | Bangtsson | G01N 30/468 |
| 2021/0149361 | A1* | 5/2021 | Jungbauer | G05B 19/0428 |
| 2022/0008704 | A1 | 1/2022 | Grant et al. | |

FOREIGN PATENT DOCUMENTS

| | | | |
|---|---|---|---|
| CN | 106353440 | A | 1/2017 |
| JP | H02-227664 | A | 9/1990 |
| JP | 2016-510981 | A | 4/2016 |
| JP | 2020-516856 | A | 6/2020 |
| JP | 2021-528978 | A | 10/2021 |
| WO | WO 2014/137903 | | 9/2014 |
| WO | WO 2018/122196 | | 7/2018 |

OTHER PUBLICATIONS

International Preliminary Report on Patentability in International Appln. No. PCT/US2022/043303, mailed on Mar. 28, 2024, 10 pages.

(Continued)

*Primary Examiner* — Pranav N Patel
(74) *Attorney, Agent, or Firm* — Fish & Richardson P.C.

(57) ABSTRACT

Methods and systems are provided to improve consistency and robustness in chromatography, for example, in operations of multi-column chromatography systems.

21 Claims, 4 Drawing Sheets

(56) References Cited

OTHER PUBLICATIONS

International Search Report and Written Opinion in International Appln. No. PCT/US2022/043303, mailed on Jan. 3, 2023, 15 pages.
[No Author Listed], "Titer Determination: Application Compendium," Agilent Technologies, Inc., Mar. 1, 2018, 28 pages.
Berninger et al., "A versatile model for simulation of reaction and nonequilibrium dynamics in multicomponent fixed-bed adsorption processes," Computers & Chemical Engineering, Nov. 1991, 15(11):749-768.

* cited by examiner

CHROMATOGRAPHY SYSTEM

CROSS-REFERENCE TO RELATED APPLICATIONS

This application claims priority to U.S. Provisional Application No. 63/243,836, filed on Sep. 14, 2021, and EP Application No. 21315233.3, filed on Nov. 3, 2021, the entire contents of which are incorporated herein by reference.

BACKGROUND

Chromatography is a procedure used to separate a target material, e.g., a target molecule, from the rest of a substance. Chromatography is used in manufacturing therapeutic drug substances such as therapeutic proteins, antibodies, enzymes, etc. Biotechnology companies use continuous chromatography to obtain a continuous yield from a harvested substance.

SUMMARY

Implementations of the present disclosure include methods and systems for improving consistency and robustness in chromatography systems that are used, for example, in producing therapeutic proteins. Examples of such therapeutic proteins can be enzymes such as cerezyme.

The present disclosure also provides one or more non-transitory computer-readable storage medium coupled to one or more processors and having instructions stored thereon which, when executed by the one or more processors, cause the one or more processors to perform operations in accordance with implementations of the methods provided herein.

Methods and systems in accordance with the present disclosure may include any combination of the aspects and features described herein. That is, methods and systems in accordance with the present disclosure are not limited to the combinations of aspects and features specifically described herein, but also include any combination of the aspects and features provided.

Among other advantages, implementations can provide one or more of the following benefits. Some implementations improve the robustness and consistency in continuous chromatography processes. Due to this robustness, the elution titer of any of the chromatography columns can be determined at any time during the chromatography process. Previously, if part of the system, such as a piece of hardware, malfunctioned, the product in the chromatography system would generally be discarded due to the unknown titer of the product. By using techniques described herein, one can calculate the elution titer of any of the columns and thus continue using the same product once the system is fixed and functioning again.

Further, improving the titer consistency of the material inputted to each of the columns throughout the chromatography process provides an assurance in the consistency of the chromatography process and reduces the risk of a target molecule's concentration falling below a minimum concentration required for the chromatography process. Since the chromatography process discussed herein is continuous, and since the harvest inputted into the chromatography system can have different concentrations at different times, it is desirable to make sure that at least the minimum concentration needed to perform a proper chromatography is maintained. Falling below the minimum required concentration can cause producing an elution that is overly diluted.

Furthermore, the chromatography process can be part of a larger purification process. Variable feed streams from the chromatography process to subsequent purification steps may necessitate a strategic pooling of the elution, which complicates the overall purification process. The improvement in the titer consistency that the present implementations provide can avoid such complications in the purification process.

Additionally, techniques described herein provide the ability of back calculating harvest titer of the harvest product that was inputted into the chromatography system. Determining the harvest titer is not an easy and quick enough process to be used in a continuous chromatography. The back calculation described herein provides the ability of determining the harvest titer after it has been used by at least one chromatography column. By using the harvest titer, one can determine how much of the harvest to add to a column to keep the concentration/titer consistency described above. The back calculation provides a near real-time estimate of the harvest titer.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure provide methods and systems for improving robustness and consistency in multi-column chromatography systems such as continuous chromatography systems that are used for continuous producing therapeutic drug substances.

Figure 1:
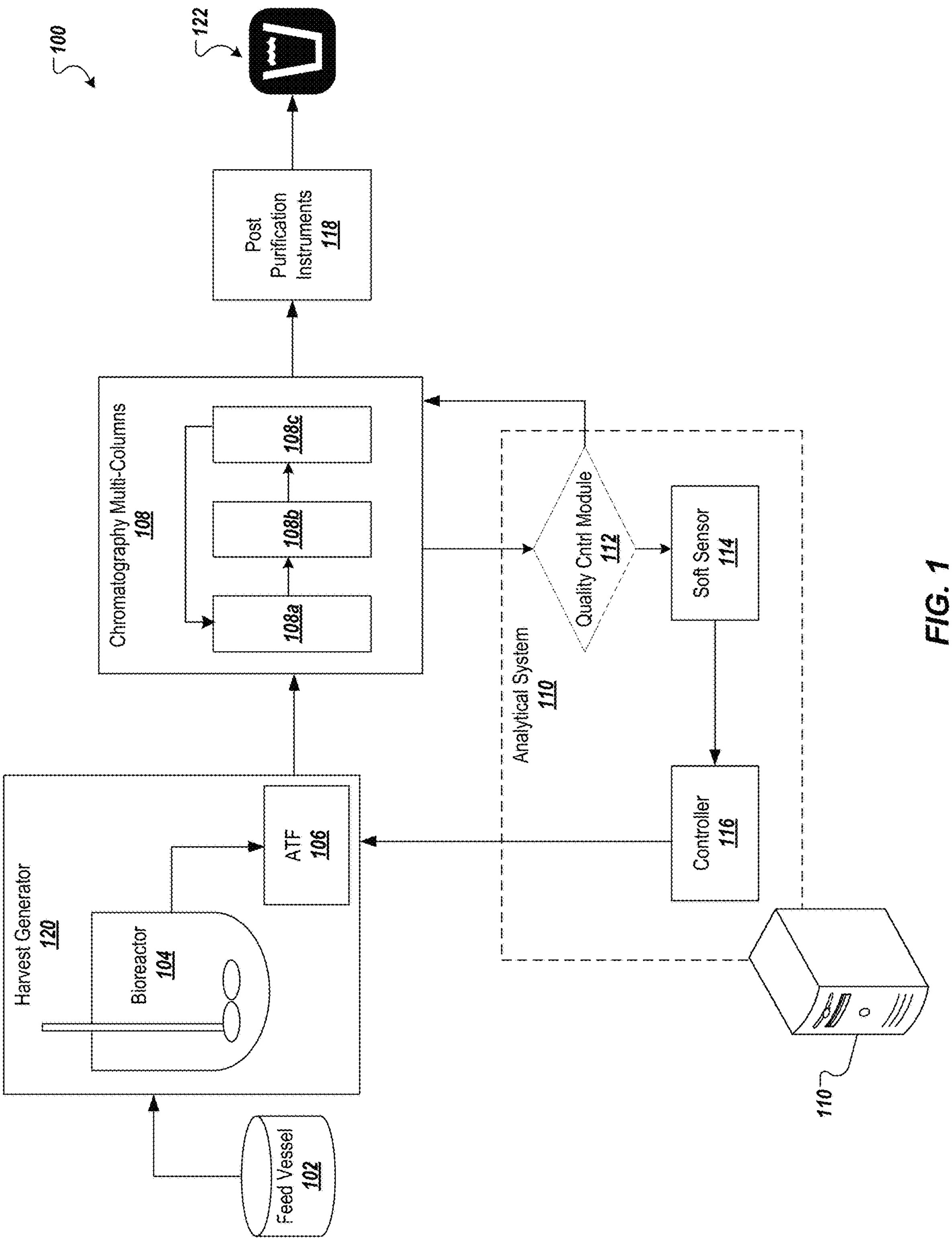
FIG. 1 illustrates an example system according to implementations of the present disclosure.

FIG. 1 illustrates an example system 100 according to implementations of the present disclosure. System 100 includes harvest generator 120, multi-column chromatography system (MCCS) 108, and analytical system 110. System 100 receives a raw material containing target molecules, e.g., molecules of a target protein, from feed vessel 102 and provides purified product 122 with a target molecule titer that is greater than a threshold.

The purification is mainly performed by MCCS 108. MCCS 108 includes multiple chromatography columns 108*a* through 108*c*. While only three columns are shown in FIG. 1, MCCS 108 can have any number of columns. The number of columns can be selected based on the application of MCCS 108, for example, the type of the target molecule, the intended titer in the purified product 122, the intended chromatography time, etc.

MCCS 108 receives a harvest product from harvest generator 120 and performs a continuous chromatography operation on the harvest product until a target yield titer greater than a specific threshold titer is obtained. MCCS 108 performs this process by running the harvest product through the columns and by loading the output of each column to the next column until the target yield titer is obtained. More specifically, the harvest product is inputted into a first column, e.g., column 108*a*, to obtain a first elution with a titer greater than the harvest product's titer. The first elution is then inputted into a second column, e.g., column 108*b*, for further chromatography and the rest of the harvest product is washed away. The second column performs the further chromatography to obtain a second elution with an even greater titer than the first elution's titer, and washes away the rest of the material. The second elution can be inputted into a third column, e.g., column 108*c*, to obtain a third elution with a greater titer than the second titer's elution. The third elution is inputted into the first column, and the process continues until the target yield titer is obtained. Once the target yield titer is obtained, MCCS 108 can provide the final elution to post purification instruments 118 for further purification.

The purification operation of MCCS 108 can take a long time to complete, for example, several days or months. During this process, bioreactor 104 continuously provides harvest product to MCCS 108. However, the titer of the harvest product can vary from time to time. Such titer variation can result in inconsistency in the MCCS 108 operation. The inconsistency would particularly be an issue when specific chromatography columns require a minimum concentration of the target molecule in order to perform an effective and proper chromatography. On the other hand, measuring the harvest product's titer is not an easy job and is a time consuming task that could affect the continuity of the process.

Implementations of the present disclosure provide a solution to these issues by improving consistency and robustness in operation of MCCS 108. The solution involves predicting the elution titer of each column based on the preceding column's titer, and adding more harvest product to the column in case of predicting a titer that is too low for the column. The solution can also back calculate the harvest product's titer or the titer of a product inputted into a particular column based on the elution titer outputted from that particular column. The back calculation provides the advantages of monitoring the harvest titer of the harvest product, and determining how much of the harvest product should be added to each column to keep a consistent target molecule concentration in the material inputted into the chromatography columns.

The prediction and the back calculation processes are performed by analytical system 110. Analytical system 110 includes a quality control module 112 that measures the elution titer outputted for each column. If the measured titer of a particular elution meets a target yield titer threshold, analytical system 110 instructs MCCS 108 to output the elution of that particular column, for example, to post purification instruments 118. Otherwise, analytical system 110 sends the measured titer to soft sensor 114 to predict the elution titer(s) of one or more of the next columns, or to back calculate the titer of the material (e.g., the harvest product) that was inputted to the particular column.

Soft sensor 114 provides the result(s) of its prediction or back calculation to controller 116. Depending on the harvest titer (that soft sensor 114 back calculated) and the predicted elution titer (that soft sensor 114 predicted for the next column), controller 116 can request harvest product to be inputted into the next column. The harvest product will be inputted to the next column so that, for example, a minimum target molecule concentration required for the next column would be met. Further details of this process are discussed below with reference to FIG. 2.

As noted above, MCCS 108 receives the harvest product from harvest generator 120. Harvest generator includes bioreactor 104, which can be a perfusion bioreactor. Bioreactor 104 receives the raw material from feed vessel 102 and performs perfusion on the raw material to obtain the harvest product. Bioreactor 104 can function to provide the harvest product continuously. In some implementations, harvest generator 120 also includes an alternating tangential flow filtration (ATF) system that pre-processes the harvest product before providing it to MCCS 108. The pre-process involves filtering out at least some undesired molecules before inputting the harvest product into MCCS 108 for purification.

Figure 2:
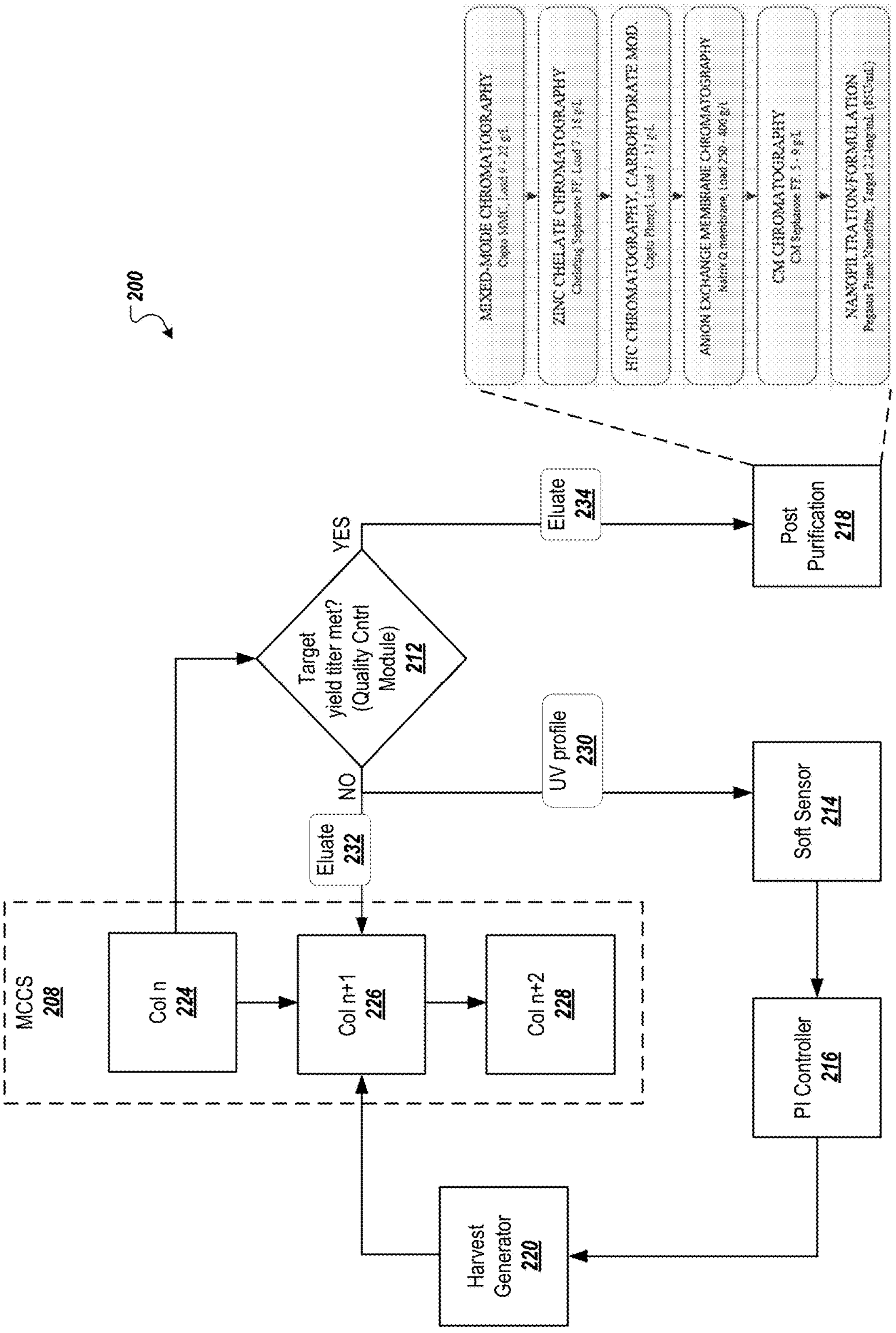
FIG. 2 provides an example process that can be performed on a system according to the present disclosure.

FIG. 2 provides an example process 200 that can be performed according to the present disclosure, for example, by system 100 in FIG. 1. Process 200 involves a chromatography process by MCCS 208, which involves multiple chromatography columns including consecutive columns 224, 226, and 228. MCCS 208 can be the same as MCCS 108 described above. If the target yield titer is not met, the elution of column 224 is inputted into column 226, and the elution of column 226 is inputted into column 228. At least some of the chromatography columns of MCCS 208 use the same materials and perform similar (e.g., the same) chromatography procedures, e.g., the same type of chromatography procedures.

The elution outputted from column 224 is studied, for example, by quality control module 212 (e.g., quality control module 112) to determine whether the target yield titer has been obtained. If the target yield titer has been obtained, the elution is provided (234) for post purification 218. The post purification can be performed by the post purification instruments 118 show in FIG. 1. The post purification can include further chromatography or purification processes examples of which are provided in FIG. 2.

If column 224's elution titer does not meet the target yield titer, quality control module 212 (i) allows or does not interrupt the elution to be inputted into the next column (232), i.e., column 226, and (ii) provides the elution's chromatogram to soft sensor 214. The chromatogram can include the ultraviolet (UV) profile 230 of the elution representing UV absorbance of the elution over a range of frequencies.

Soft sensor 214 uses the chromatogram to perform respective calculations to predict the elution titer of column 226, or to back calculate the titer of the harvest product or the titer of an elution that had been inputted to column 224. Soft sensor 214 can use any of peak height, peak start and end volumes, peak start and slope values, or peak area of the chromatogram to perform the calculations.

In some implementations, soft sensor 214 performs the calculations based on the chromatogram's peak area, for example, by using Beer's law presented below:

Area≈mass out=Yield*mass in=Res.Time*Ext.Coef*pathlength*Yield*Load where Area is the area of the peak in the chromatogram. In some implementations, soft sensor 214 uses the following formula to make its calculations:

$$\text{Area } [mAU*\text{min}] = 5950\left[\frac{mAU*\text{min}}{\frac{g}{L_{CV}}}\right]*\text{Loading }\left[\frac{g}{L_{CV}}\right]$$

where the parameters in the brackets are example units that can be used. Soft sensor 214 provides the result of its calculations (i.e., its prediction or back calculation) to proportional-integral (PI) controller 216. PI controller 216 can be the same as controller 116 described above.

PI controller 216 compares the elution titer predicted for column 226 to a threshold value, and in response to determining that the elution titer is less than the threshold value, requests harvest product to be delivered to column 226. The threshold value can be set based on a minimum concentration of the target molecule that is required for the next column, i.e., column 228, to perform a proper chromatography. The requested harvest product can be provided by harvest generator 220, which can be the same as harvest generator 120 described above.

In some implementations, PI controller 216 requests a particular amount (e.g., a fixed preset amount) of the harvest product to be delivered to column 226. In some implementations, PI controller 216 requests an amount of the harvest product based on the difference between the elution titer and the threshold value, and based on a harvest titer of the harvest product. The harvest titer can be an amount back calculated for the harvest product that was previously inputted into MCCS 208, or an amount that was recently calculated, e.g., the most recent back calculated harvest titer.

Soft sensor 214 can be the same as soft sensor 114 shown in FIG. 1. Soft sensor 214 can be optimized, for example, by using a discrete PI control, by applying a Monte Carlo method or simulation, or by applying machine learning methods on training data.

Figure 3:
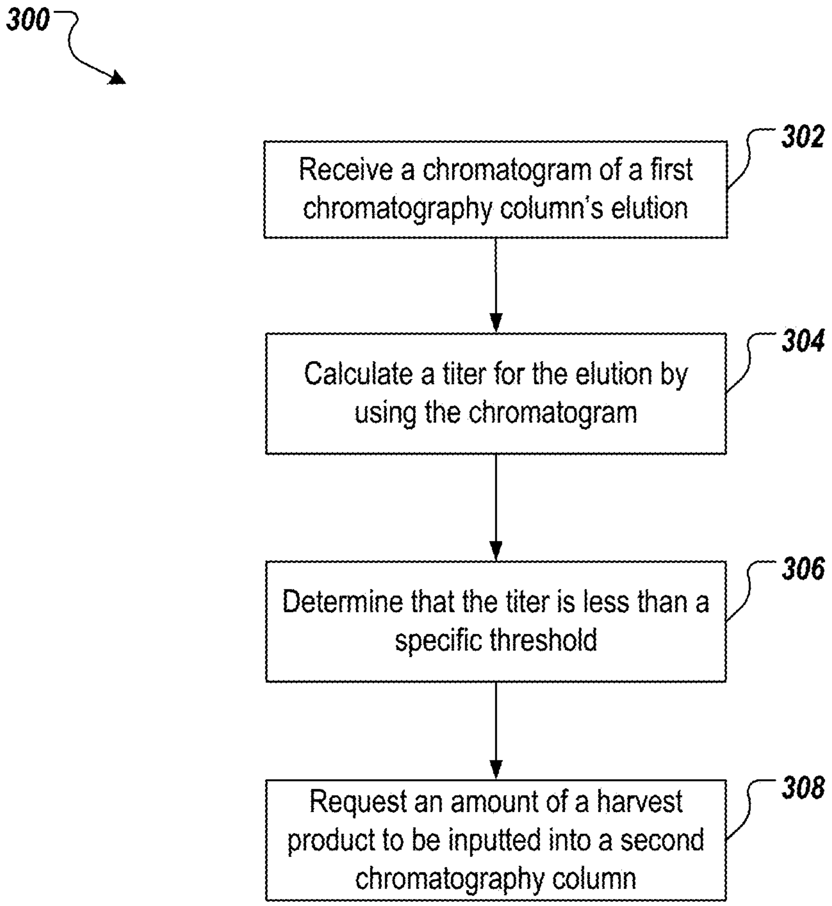
FIG. 3 provides an example process that can be executed in accordance with implementations of the present disclosure.

FIG. 3 provides an example process 300 that can be executed in accordance with implementations of the present disclosure. Process 300 can be performed by a computing system, for example, by the analytical system 110 shown in FIG. 1.

The computing system receives a chromatogram of an elution produced by a first column of a multi-column chromatography system (302). The multi-column chromatography system can be MCCS 108/208 described above.

The computing system uses the chromatogram to calculate a titer of a target molecule in the elution (304). The system can use the peak area of the chromatogram to make the calculation. The system can use Beer's law to calculate the titer.

The computing system compares the calculated titer to a specific concentration threshold. In response to determining that the calculated titer is less than the concentration threshold (306), the computing system requests an amount of a harvest product to be inputted into a second chromatography column (308) of the multi-column chromatography system. The concentration threshold can, for example, be predetermined based on a minimum concentration of the target molecule required for the chromatography system (or for a particular column of the chromatography system) to perform a proper chromatography.

Figure 4:
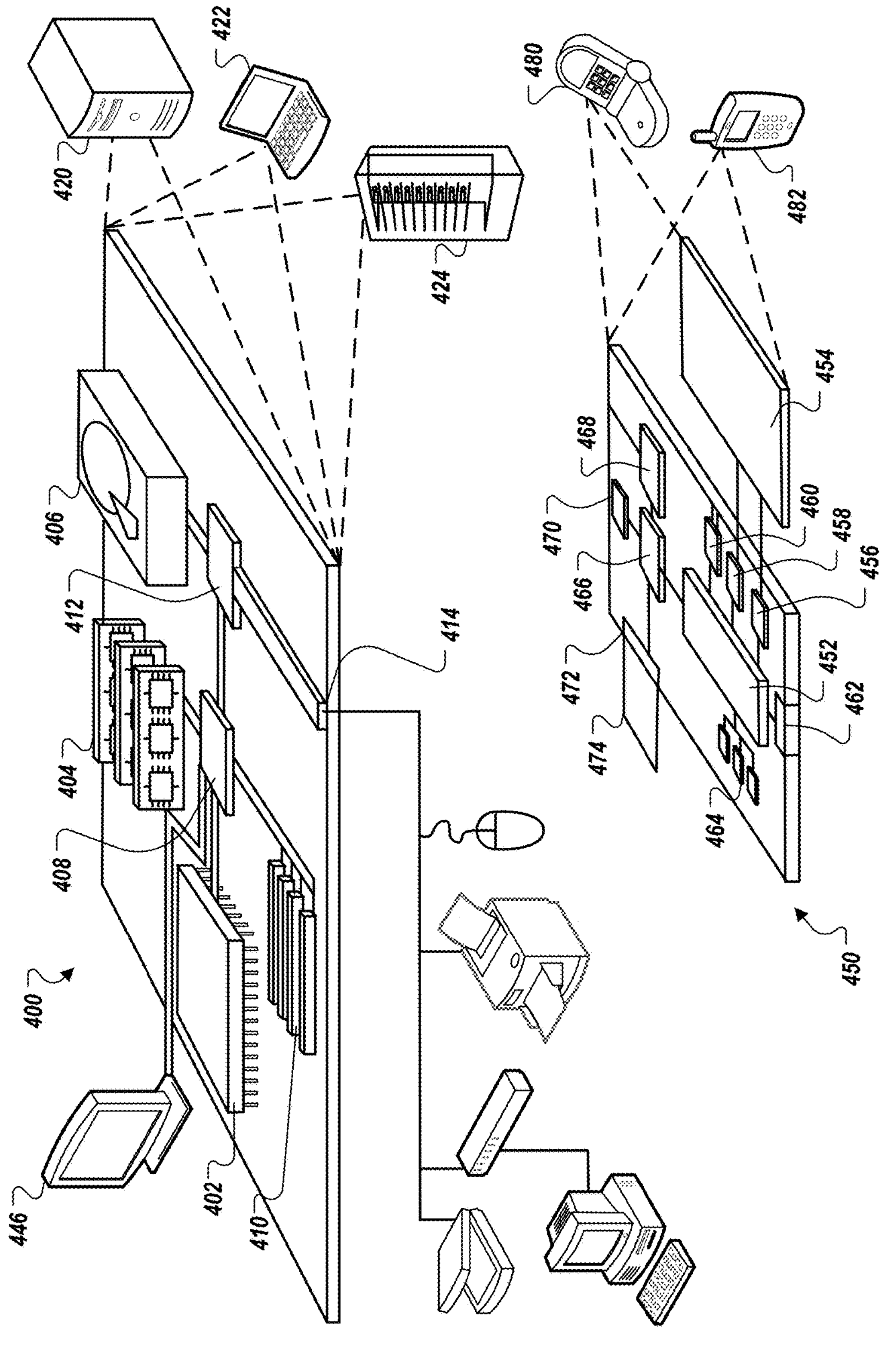
FIG. 4 shows a schematic diagram of an example computing device and a mobile computing device that can perform the methods described in the present disclosure.

FIG. 4 shows an example of a computing device 400 and an example of a mobile computing device that can be used to implement the techniques described here. For example, the analytical system 110 in FIG. 1 can be in the form of the computing device 400, the mobile computing device 450, or a combination of them. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and can be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 can also be another form of computer-readable medium, such as a magnetic or optical disk.

The storage device 406 is capable of providing mass storage for the computing device 400. In some implementations, the storage device 406 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which can accept various expansion cards (not shown). In the implementation, the low-speed interface 412 is coupled to the storage device 406 and the low-speed expansion port 414. The low-speed expansion port 414, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 400 can be implemented in a number of different forms, as shown in the figure. For example, it can be implemented as a standard server 420, or multiple times in a group of such servers. In addition, it can be implemented in a personal computer such as a laptop computer 422. It can also be implemented as part of a rack server system 424. Alternatively, components from the computing device 400 can be combined with other components in a mobile device (not shown), such as a mobile computing device 450. Each of such devices can contain one or more of the computing device 400 and the mobile computing device 450, and an entire system can be made up of multiple computing devices communicating with each other.

The mobile computing device 450 includes a processor 452, a memory 464, an input/output device such as a display 454, a communication interface 466, and a transceiver 468, among other components. The mobile computing device 450 can also be provided with a storage device, such as a micro-drive or other device, to provide additional storage. Each of the processor 452, the memory 464, the display 454, the communication interface 466, and the transceiver 468, are interconnected using various buses, and several of the components can be mounted on a common motherboard or in other manners as appropriate.

The processor 452 can execute instructions within the mobile computing device 450, including instructions stored in the memory 464. The processor 452 can be implemented as a chipset of chips that include separate and multiple analog and digital processors. The processor 452 can provide, for example, for coordination of the other components of the mobile computing device 450, such as control of user interfaces, applications run by the mobile computing device 450, and wireless communication by the mobile computing device 450.

The processor 452 can communicate with a user through a control interface 458 and a display interface 456 coupled to the display 454. The display 454 can be, for example, a TFT (Thin-Film-Transistor Liquid Crystal Display) display or an OLED (Organic Light Emitting Diode) display, or other appropriate display technology. The display interface 456 can comprise appropriate circuitry for driving the display 454 to present graphical and other information to a user. The control interface 458 can receive commands from a user and convert them for submission to the processor 452. In addition, an external interface 462 can provide communication with the processor 452, so as to enable near area communication of the mobile computing device 450 with other devices. The external interface 462 can provide, for example, for wired communication in some implementations, or for wireless communication in other implementations, and multiple interfaces can also be used.

The memory 464 stores information within the mobile computing device 450. The memory 464 can be implemented as one or more of a computer-readable medium or media, a volatile memory unit or units, or a non-volatile memory unit or units. An expansion memory 474 can also be provided and connected to the mobile computing device 450 through an expansion interface 472, which can include, for example, a SIMM (Single In Line Memory Module) card interface. The expansion memory 474 can provide extra storage space for the mobile computing device 450, or can also store applications or other information for the mobile computing device 450. Specifically, the expansion memory 474 can include instructions to carry out or supplement the processes described above, and can include secure information also. Thus, for example, the expansion memory 474 can be provide as a security module for the mobile computing device 450, and can be programmed with instructions that permit secure use of the mobile computing device 450. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 can communicate wirelessly through the communication interface 466, which can include digital signal processing circuitry where necessary. The communication interface 466 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 468 using a radio-frequency. In addition, short-range communication can occur, such as using a Bluetooth, WiFi, or other such transceiver (not shown). In addition, a GPS (Global Positioning System) receiver module 470 can provide additional navigation- and location-related wireless data to the mobile computing device 450, which can be used as appropriate by applications running on the mobile computing device 450.

The mobile computing device 450 can also communicate audibly using an audio codec 460, which can receive spoken information from a user and convert it to usable digital information. The audio codec 460 can likewise generate audible sound for a user, such as through a speaker, e.g., in a handset of the mobile computing device 450. Such sound can include sound from voice telephone calls, can include recorded sound (e.g., voice messages, music files, etc.) and can also include sound generated by applications operating on the mobile computing device 450.

The mobile computing device 450 can be implemented in a number of different forms, as shown in the figure. For example, it can be implemented as a cellular telephone 480. It can also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A system comprising:

a bioreactor configured to produce a harvest product that includes a target molecule;

a multi-column chromatography system configured to purify the harvest product with respect to the target molecule, the multi-column chromatography system comprising a first chromatography column and a second chromatography column, wherein the first chromatography column is configured to produce a first elution product, and wherein the chromatography system is configured to input the first elution product into the second chromatography column; and a computing system comprising one or more processors configured to control an amount of the harvest product to be inputted into the second chromatography column by performing one or more operations comprising:

comparing a first yield titer of the target molecule in the first elution product against a concentration threshold of the target molecule, and in response to determining that the first yield titer is less than the concentration threshold, requesting an amount of the harvest product to be inputted into the second chromatography column so that a combination of the first elution product and the amount of the harvest product provides a titer greater than or equal to the concentration threshold.

2. The system of claim 1, wherein the chromatography system is further configured to input into a third chromatography column a second elution product produced by the second chromatography column, and wherein the concentration threshold is preset based on a minimum concentration of the target molecule required for the third chromatography column to perform a chromatography.

3. The system of claim 1, wherein the computing system calculates the first yield titer based on a chromatogram of the first elution product.

4. The system of claim 1, wherein the computing system is configured to back calculate a concentration of the target molecule in the harvest product inputted into the first chromatography column based on a chromatogram of the first elution product.

5. The system of claim 1, further comprising a filter that performs an alternative tangential flow filtration on the harvest product before providing the harvest product to the second chromatography column.

6. The system of claim 1, wherein the second chromatography column includes the same materials as the first chromatography column, and the first and second chromatography columns perform one or more chromatography procedures.

7. The system of claim 1, wherein a purified product produced by the chromatography system has a target molecule titer that is greater than the concentration threshold.

8. The system of claim 7, further comprising an ultra-purification system that receives the purified product from the chromatography system and performs further chromatography operations on the purified product.

9. The system of claim 1, wherein the bioreactor continuously feeds the chromatography system while the chromatography system is operating.

10. The system of claim 1, wherein the system is used in producing cerezyme.

11. The system of claim 1, wherein the one or more operations performed by the one or more processors comprise: causing the amount of the harvest product to be inputted into the second chromatography column of the multi-column chromatography system.

12. A computer-implemented method comprising:

receiving a chromatogram of an elution product that is being outputted from a first chromatography column of a multi-column chromatography system, wherein the multi-column chromatography system is configured to purify a harvest product with respect to a target molecule and comprises a first chromatography column and a second chromatography column, wherein the harvest product includes the target molecule and is produced by a bioreactor, wherein the chromatography system is configured to input the first elution product into the second chromatography column;

calculating a first yield titer of a target molecule in the elution product based on the chromatogram; and determining that the first yield titer is less than a concentration threshold, and in response to determining that the first yield titer is less than the concentration threshold, requesting an amount of the harvest product to be inputted into the second chromatography column of the multi-column chromatography system so that a combination of the elution product and the amount of the harvest product provides a titer greater than or equal to the concentration threshold.

13. The method of claim 12, wherein the elution product is a first elution product, and the method further comprises inputting into a third column of the multi-column chromatography system a second elution product produced by the second chromatography column, wherein the concentration threshold is preset based on a minimum concentration of the target molecule required for the third chromatography column to perform a chromatography.

14. The method of claim 12, further comprising determining the amount of the harvest product based on a difference between the first yield titer and the concentration threshold.

15. The method of claim 12, further comprising back calculating a concentration of the target molecule in the harvest product inputted into the first chromatography column based on a chromatogram of the elution product.

16. The method of claim 12, further comprising:

obtaining the harvest product from the bioreactor;

pre-processing the harvest product by an alternative tangential flow filtration; and in response to the pre-processing, providing the harvest product to the second chromatography column.

17. A non-transitory, computer-readable medium storing one or more instructions executable by a computer system to perform operations comprising:

receiving a chromatogram of an elution product that is being outputted from a first chromatography column of a multi-column chromatography system, wherein the multi-column chromatography system is configured to purify a harvest product with respect to a target molecule and comprises a first chromatography column and a second chromatography column, wherein the harvest product includes the target molecule and is produced by a bioreactor, wherein the chromatography system is configured to input the first elution product into the second chromatography column;

calculating a first yield titer of a target molecule in the elution product based on the chromatogram;

comparing the first yield titer to a specific concentration threshold; and in response to determining that the first yield titer is less than the concentration threshold, requesting an amount of the harvest product to be inputted into the second chromatography column of the multi-column chromatography system so that a combination of the elution product and the amount of the harvest product provides a titer greater than or equal to the concentration threshold.

18. The non-transitory, computer-readable medium of claim 17, wherein the elution product is a first elution product, and the operations further comprise inputting into a third chromatography column of the multi-column chromatography system a second elution product produced by the second chromatography column, wherein the concentration threshold is preset based on a minimum concentration of the target molecule required for the third chromatography column to perform a chromatography.

19. The non-transitory, computer-readable medium of claim 17, wherein the operations further comprise determining the amount of the harvest product based on a difference between the first yield titer and the concentration threshold.

20. The non-transitory, computer-readable medium of claim 17, further comprising back calculating a concentration of the target molecule in the harvest product inputted into the first chromatography column based on a chromatogram of the elution product.

21. The non-transitory, computer-readable medium of claim 17, wherein the operations further comprise:

obtaining the harvest product from the bioreactor;

pre-processing the harvest product by an alternative tangential flow filtration; and in response to the pre-processing, providing the harvest product to the second chromatography column.

* * * * *